United States Patent [19]

Boudreau et al.

[11] Patent Number: 4,944,569

[45] Date of Patent: Jul. 31, 1990

[54] MULTI-FIBER ALIGNMENT PACKAGE FOR OPTOELECTRONIC COMPONENTS

[75] Inventors: Robert A. Boudreau, Hampton, N.H.; Joanne S. LaCourse, Hudson, Mass.

[73] Assignee: GTE Laboratories Incorporated, Waltham, Mass.

[21] Appl. No.: 395,931

[22] Filed: Aug. 18, 1989

[51] Int. Cl.[5] .............................................. G02B 6/36
[52] U.S. Cl. .................................... 350/96.20; 357/81
[58] Field of Search ............... 350/96.15, 96.18, 96.20, 350/96.21, 96.22; 357/81

[56] References Cited

U.S. PATENT DOCUMENTS

| | | | |
|---|---|---|---|
| 4,399,453 | 8/1983 | Berg et al. | 357/81 |
| 4,399,541 | 8/1983 | Kovats et al. | 372/36 |
| 4,500,165 | 2/1985 | Scholl et al. | 350/96.20 |
| 4,730,198 | 3/1988 | Brown et al. | 350/96.20 |
| 4,758,719 | 7/1988 | Sasaki et al. | 250/227 |

OTHER PUBLICATIONS

C. E. Zah et al: "1.3 um GaInAsP Near-Travelling-Wave Laser Amplifiers Made by Combination of Angled Facets and Antireflection Coatings", Electronics Letters 24, 1275 (1988).
J. LaCourse et al: "1.3 um Tilted-Cavity Semiconductor Laser Amplifier", to be presented at SPIE OE/-FIBERS'89, Boston, Ma, Sep. 5-8, 1989.
S. Enochs, "A Packaging Technique to Achieve Stable Single-Mode Fiber Laser Alignment", Proc. SPIE 703, 42 (1987).
L. A. Reith et al: "Design of a Low-Cost Laser Package for Local Loop Applications Using Graded-Index Lenses", Proc. SPIE, 836, 327 (1988).
K. P. Jackson et al: "Optical Fiber Coupling Approaches for Multi-Channel Laser and Detector Arrays", Proc. SPIE, 994, 40 (1988).
D. S. Barger, "An Automated Fiber Alignment, Fixing, and Hermetic Sealing System", Proc. SPIE, 994, 11 (1988).
K. Yoshino & M. Ikeda, "Novel Assembly Method for Laser-Diode Optical Switch Module", Electron. Lett. 25, 62 (1989).
Guide to Indalloy Specialty Alloys, Indium Corporation of America, Utica, N.Y., Oct. 1983.
Product Sheet, Thermoelectric Heat Pump Module Specifications, Materials Electronic Products Corporation, Trenton, N.J., undated.
Product Sheet, The Plano-Convex Selfoc Micro Lens PC-SML, NSG America, Inc., undated.
L. A. Reith et al., "Singlemode Fiber Coupling to a Travelling Wave Laser Amplifier", Belcore, Morristown, N.J. (CLEO/89).
K. H. Cameron et al., "Packaged Laser Amplifiers at 1.5 um for Submarine Systems", British Telcom Research Laboratories, Martlesham Heath, Ipswich, UK (CLEO/89).

*Primary Examiner*—William L. Sikes
*Assistant Examiner*—Akm E. Ullah
*Attorney, Agent, or Firm*—James J. Cannon, Jr.; Victor F. Lohmann, III

[57] ABSTRACT

A localized cooling method allows the sequential alignment and soldering of one optical fiber at a time to a semiconductor package, while previously aligned and soldered optical fibers are held fixed. This method utilizes the mechanical property of a sharp melting point eutectic alloy solder or a pure metal solder for the fiber connections and is effective for multi-fiber optoelectronic packages demanding stability and high precision. A package design for optoelectronic components requiring multi-fiber alignment incorporates this feature of localized cooling internally. The localized cooling method and the novel package utilizing this method internally make it possible to eliminate the tilted angle optical fiber alignment problem by mounting tilted facet optical amplifier components at a predetermined offset angle.

17 Claims, 5 Drawing Sheets

MULTI-FIBER ALIGNMENT PACKAGE FOR OPTOELECTRONIC COMPONENTS

BACKGROUND OF THE INVENTION

This invention relates to packaging of optoelectronic components which generate or process signals that pass through optical fibers. In particular, it addresses the critical need for providing stable, low-cost alignment of multiple optical fibers to a single packaged optoelectronic integrated circuit device, such as an optical amplifier.

An optoelectronic package is a container or housing that provides protection and support for both active and passive components contained within it. These components and their interconnection define an optical-electrical circuit and the function of the package. The package also includes a means of connecting the internal components with the external environment, usually as electrical feed-through and optical fiber. This invention is directed to the optical fiber and its connection to the components within the package.

To make an optical connection between an optical fiber and a component within a package, it is necessary to position or align the optical fiber in a way that allows efficient coupling between the optical fiber and the component. The precision needed for the alignment depends on the size of the light-emitting or light-receiving elements, the type of optical fiber, and any type of focussing or defocusing element which may be present, such as a lens on the optical fiber. An optical fiber transmits light through its inner core, which is much smaller than the diameter of the optical fiber. There are two classes of optical fiber presently used in packaging semiconductor devices: single-mode and multimode, with core diameters of 10 $\mu$m and 100 $\mu$m, respectively. Most telecommunication systems use singlemode fiber because it is superior in reducing noise arising from mode partition noise. Connecting an optical fiber to a semiconductor device is difficult. Extremely tight tolerances, on the order of 1 $\mu$m, are required due to the small size (about one micron) of the active region of the semiconductor device. Additional problems arise when more than one optical fiber needs to be coupled to a single device, since this necessarily entails either simultaneous alignment or sequential alignment of the semiconductor device to multiple optical fibers. Simultaneous alignment is difficult because it requires a sudden "freezing" of the position of all optical fibers at once. Sequential alignment is costly and time-consuming, as will be explained infra.

Examples of semiconductor devices which require the coupling of multiple optical fibers are shown in FIGS. 1a and 1b FIG. 1a shows a top view of an array 10 of three semiconductor lasers, used as light sources for such purposes as parallel processing. The active layers are designated by the reference number 12 and the output beams by 14. An optical fiber must be coupled to each lasing output beam 14. FIG. 1b shows a top view of a tilted facet laser optical amplifier 15, having an active layer 16, which receives light at one end and outputs the amplified light at the other end. One optical fiber 17 must couple the light signal into the amplifier 15, and another optical fiber 18 must couple the amplified output. The amplifier 15 shown in FIG. 1b has facets 19 (mirrors) which are tilted 7 degrees with respect to the active layer 16. This tilt reduces the internal reflections in the active layer 16, and permits greater amplification of the light signal. (See C. E. Zah, C. Caneau, F. K. Sohkoohi, S. G. Menocal, F. Favire, L. A. Reith, and T. P. Lee, "1.3 $\mu$m GaInAsP Near-Travelling-Wave Laser Amplifiers Made by Combination of Angled Facets and Antireflection Coatings", Electronics Letters 24, 1275 (1988), and J. LaCourse, W. Rideout, P. Gaslioli, and E. Meland, "1.3 $\mu$m Tilted-Cavity Semiconductor Laser Amplifier", to be presented at SPIE OE/FIBERS '89, Boston, Mass. Sept. 5-8, 1989). However, the tilted facets 19 introduce another problem: for optimum coupling, the input and output optical fibers 17, 18 must be tilted with respect to the facet 19 by 23 degrees. This arises from Snell's law of refraction:

$$n_{air}\sin\theta_{air} = n_{device}\sin\theta_{device}$$

where $n_{air}$ is the refractive index of air, (approximately 1); $\theta_{air}$ is the peak angle of the beam in air (measured relative to the perpendicular to the facet); $n_{device}$ is the refractive index of the semiconductor material, typically approximately 3.3; and $\theta_{device}$ is the angle of the active layer inside the device (measured relative to the perpendicular to the facet). For example, if $\theta_{device}=7°$ as shown in FIG. 1b, this equation mandates that the output beam 18 is tilted at $\theta_{air}=23°$.

FIG. 2 shows coupling performance between a singlemode fiber and a high speed laser, a typical telecommunications component. Here, the position sensitivity of the optical fiber can be as little as 1 $\mu$m, a size much smaller than the parts themselves. The prior art shows methods for such a precise alignment, but, until recently, for only one singlemode optical fiber per package. (See S. Enochs, "A Packaging Technique to Achieve Stable Single-Mode Fiber Laser Alignment", Proc. SPIE 703, 42 (1987) Other alignment methods make use of GRIN lenses, adding the complexity of aligning an additional optical element. (See L. A. Reith, J. W. Mann, and P. W. Shumate, "Design of a Low-cost Laser Package for Local Loop Applications Using Graded-Index Lenses", Proc. SPIE, 836, 327 (1988).) These prior art methods are costly, because of generally low yields and the fact that the alignment step is usually the last step in the manufacture of the package. The problem is compounded when more than one singlemode optical fiber must be aligned to the same package.

Prior art for multi-fiber alignment to a single package is predominantly concerned with the easier task of coupling large core multimode optical fiber to relatively large light sources and detectors. (See K. P. Jackson, A. J. Moll, E. B. Flint, and M. F. Cina, "Optical Fiber Coupling Approaches for Multi-Channel Laser and Detector Arrays", Proc. SPIE, 994, 40 (1988).) These alignments are less sensitive to position and can often be done with grooved parts and epoxy to fasten the optical fiber. This technology is acceptable for short length optical fiber links in local area networks or computers, but not for telecommunications.

Prior art also shows how laser welding can be used for connecting both singlemode and multi-mode optical fiber to packages. (See D. S. Bargar, "Automated Fiber Alignment, Fixing, and Hermetic Sealing System", Proc. SPIE, 994, 11 (1988).) The most recent art teaches two techniques for coupling multiple singlemode fibers to laser amplifiers. K. H. Cameron, et al, "Packaged Laser Amplifiers at 1.5 $\mu$m for Submarine Systems", British Telcom Research Laboratories, Martiesham, Ipswich, UK (1989), disclose the use of sequential laser welding. Disadvantageously, this welding method calls for the investment in an expensive laser and is not suitable for reworking optical fibers which were originally connected misaligned, presenting a yield problem for packages with many optical fiber connections.

A second alignment technique for a multi-fiber laser amplifier package is taught by L. A. Reith, et al, "Single mode fiber coupling to a traveling wave laser amplifier", Bellcore, Morristown, N.J. (1989). In this technique, two GRIN lenses are used at both the input and the output. The addition of extra optical elements introduces complexity, alignment problems and additional expense.

Most recently, another approach requiring the manipulation of the component with respect to previously fixed optical fibers was published. (See K. Yoshino and M. Ikeda, "Novel Assembly Method for Laser-Diode Optical Switch Module", Electron. Lett. 25, 62 (1898).) This approach suffers because it requires a simultaneous alignment to two fixed optical fibers, requiring positional optimization of the semiconductor to a "compromise" position which may not be individually optimized for either optical fiber.

This specification discloses a new technique for sequential alignment, that is, aligning and "freezing" first one optical fiber, than aligning and "freezing" the second one, and so forth.

SUMMARY OF THE INVENTION

In a first aspect of the invention, a localized cooling method allows the alignment and soldering of a fiber connection for one optical fiber at a time to a semiconductor device, while previously aligned and soldered optical fibers are held fixed. This method starts with the selection of a thermally conductive carrier and mounting the optoelectronic component on said carrier. Then the fibers to be coupled to said component are secured in a fiber-positioning means and actively aligned sequentially with the component by micro-manipulating the fiber-positioning means. As each fiber is positioned for optimal coupling, its fiber-positioning means is soldered to the carrier while simultaneously the carrier is locally cooled just under the connection position so that the sequential soldering of one fiber connection does not interfere with other previously soldered fiber connections. Cooling is achieved by reversing the polarity of thermoelectric coolers affixed to the underside of the carrier, which thermoelectric coolers are later used to maintain a stable operational temperature for the optoelectronic package. This method utilizes the mechanical property of a sharp melting point eutectic alloy solder or a pure metal solder, and is effective for multi-fiber optoelectronic packages demanding stability and high precision.

In a second aspect of the invention, a package design for optoelectronic components requiring multi-fiber alignment incorporates this feature of localized cooling internally. The package includes the carrier, the component mounted on the carrier and one fiber-positioning means for each fiber. Each fiber-positioning means is a fiber block with the fiber threaded therethrough and soldered in position in the block. Each fiber block has a corresponding thermoelectric cooler mounted on the underside of the carrier directly beneath the fiber block. The thermoelectric cooler provides localized cooling for sequential soldering of the fiber blocks and by supplying a constant temperature at the carrier for stable operation of the semiconductor component in operational use.

In a third aspect of the invention, thermal dissipation during local soldering can be enhanced by openings or slots in the carrier and/or additional carrier material positioned between any two fiber connection points.

Lastly, in another aspect of the invention, the localized cooling method and the novel package utilizing this method internally make it possible to eliminate the tilted angle optical fiber alignment problem by mounting the tilted facet optical amplifier components at a predetermined offset angle. The multi-fiber alignment package of this invention provides all these features without the cost and uncertainty of laser welding.

BRIEF DESCRIPTION OF THE DRAWINGS

FIG. 3b is a diagrammatic top view of the embodiment of FIG. 3a;

DESCRIPTION OF THE PREFERRED EMBODIMENTS

Figure 3A:
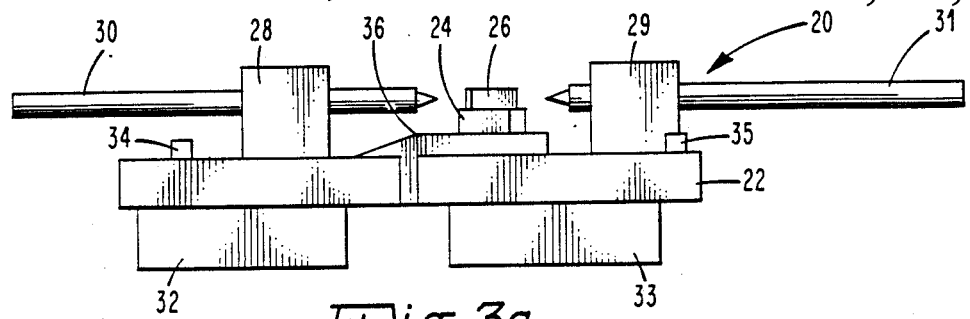
FIG. 3a is a diagrammatic side view of the preferred embodiment of the multi-fiber alignment package for optoelectronic components for two stabilized optical fibers, according to the invention.
Figure 3B:
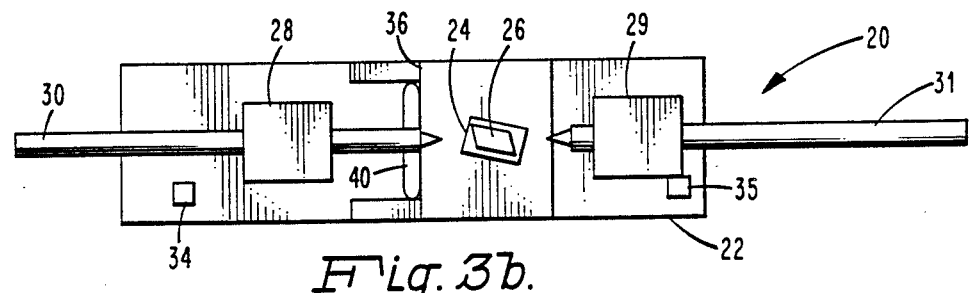

Referring again to the drawings, FIGS. 3a and 3b are diagrammatic top and side views respectively of the preferred embodiment of the multi-fiber alignment package for optoelectronic components, according to the invention. In FIGS. 3a and 3b, the preferred embodiment is illustrated by a specific example showing the package design for two optical fibers aligned with one optoelectronic component. It should be understood that the invention is not limited to this example. More than two optical fibers may be aligned with one component and two or more optical fibers may be aligned with each of two or more components within the package of this invention. Also, the embodiment of FIGS. 3a and 3b shows the optoelectronic component as a tilted facet optical amplifier. It should be understood that any light emitting and/or light receiving component may be used in the practice of the invention. Typically these components will be semiconductor devices.

The multi-fiber alignment package, designated generally by the reference number 20 in the embodiment of FIGS. 3a and 3b, has a carrier 22 serving as a substrate, preferably of one piece to minimize flexing at a joint. Carrier 22 is fabricated in the form of a rectangular slab from a thermally conductive material, preferably copper, and has two major surfaces on which the other parts of this package are mounted. For the embodiment of FIGS. 3a and 3b a submount 24 is secured to the upper major surface of carrier 22.

An optoelectronic component 26, usually a semiconductor device, is firmly secured to the submount 24. Submount 24 is secured to carrier 22 by solder and may be pivoted to an angle with respect to input and output fibers for purposes of alignment, as will be explained later. Preferably, a high melting point solder is used for this attachment of submount 24 to carrier 22.

Each optical fiber 30, 31 to be aligned with component 26 is threaded through a fiber-positioning means, preferably a fiber block 28, 29 in which the fiber is surrounded with solder to evenly distribute forces on the fibers 30, 31. Fibers 30, 31 extend through two opposed sides of fiber blocks 28, 29, the fiber end being coupled with the optical component extending outwardly only a short distance to provide stability. As will be explained hereinafter, the method of securing the fiber blocks 28, 29 to the carrier 22 and the resulting optoelectronic package are the subject of the present invention.

FIG. 3a also shows two thermoelectric coolers 32, 33 secured to the underside, or second major surface, of carrier 22. Such coolers are known in the art and are commercially available under the trade name "MELCOR" from Materials Electronic Products Corporation, Trenton, N.J. Each thermoelectric cooler 32, 33 is positioned under one fiber block 28, 29 respectively and each functions to regulate the temperature of carrier block 22 in the vicinity of the fiber block with which it is associated. A plurality of thermistors 34, 35, one for each fiber block 28, 29, serve as sensors in the circuit of thermoelectric coolers 32. The electrical connections of a thermoelectric cooler are known in the art and are not described herein.

Having described the physical parts of the optoelectronic component package 20 of the present invention, we turn now to a description of the method of alignment of multiple optical fibers to a single light emitting or light receiving component. This invention provides a novel method for the sequential alignment of each optical fiber to the component, in which a first optical fiber is aligned with the component, then secured or "frozen" in position by soldering its fiber block to the carrier and cooling the carrier beneath the area of this fiber connection. With the first fiber thus aligned, and secured in position, a second optical fiber is aligned and secured in position by soldering its fiber block to said carrier without disturbing the alignment of the first fiber connection. This sequential process of alignment and soldering utilizes the thermoelectric coolers to regulate the temperature of each fiber connection point and continues until all optical fibers have been aligned and secured.

Specifically referring to the embodiment of FIGS. 3a and 3b, the method proceeds as follows: Optical fiber 30 in fiber block 28 is chosen as the first to be aligned with component 26, using an active alignment process. If, for example, component 26 is an optical amplifier, it is electrically biased to operate as a diode laser or light emitting diode. Fiber 30 secured within fiber block 28 is then aligned to an optimal coupling position that maximizes its reception of light, a condition monitored by coupling a detector to the opposite end of the fiber 30. The manipulation of fiber 30 is achieved by manipulating fiber block 28 with a suction-tipped micromanipulator arm with piezo-electric controls having submicron positional sensitivity.

After this alignment of fiber 30, the connection of fiber block 28 to carrier 22 is made by using a sharp melting point solder such as a pure metal or an alloy eutectic. This type of solder ensures a very narrow temperature range between the liquid phase working temperature of the solder and its solid phase used to hold fiber block 28 in position. By keeping the temperature range narrow, it is possible to maximize the thickness of carrier 22 and its associated structural rigidity despite heat leakage from the hot side to the cold side. A typical solder useful for this purpose is Indalloy No. 8, manufactured by Indium Corporation of America, Utica, N.Y.

To stabilize the connection of fiber block 29 before the next sequential connection of fiber block 29 is made, thermoelectric cooler 32 is utilized. Experiments have shown that thermoelectric cooler 32 provides its localized cooling to first fiber block 28 connection point in two ways. Cooler 32 first provides cooling by acting as a heat sink since its large face is bonded directly under carrier 22, supplying a large area through which heat can flow away from carrier 22. Secondly, by its nature, thermoelectric cooler 32 provides direct cooling when the voltage polarity on it is reversed. After the optoelectronic package 20 is completed, however, the thermoelectric coolers 32, 33 are used in their normal role of supplying a constant temperature at carrier 22 for proper and stable operation of semiconductor component 26. Carrier 22 and its associated thermoelectric coolers 32, 33 therefore contribute to their own self-assembly.

After the connection of fiber block 28 is stabilized, one proceeds to the active alignment of fiber 31 secured within fiber block 29 to effect an optimal coupling by the micromanipulation of the fiber block 29 with respect to component 26. During the soldering of the fiber block 29 to carrier 22, thermoelectric cooler 33 is used to provide localized cooling under this second connection.

FIG. 3a shows two thermoelectric coolers 32, 33 secured to carrier 22, which is the heart of the design for stabilizing a two-fiber connection. It should also be noted that the semiconductor die 26 is mounted on a submount 24 that can be pivoted to a pre-set angle to compensate for the tilted-angle problem, as described above. This figure shows the preferred embodiment for a tilted-facet semiconductor optical amplifier 26 which needs two fiber alignments and a tilted submount 24 for the semiconductor 26.

Several features of this design provide stability to the connected fibers 30, 31 in fiber blocks 28, 29. First, the entire assembly is mounted on a one-piece carrier 22 to minimize flexing which might happen at a joint. Second, the fibers 30, 31 are threaded through blocks 28, 29 which surround them with solder, evenly distributing forces on the fibers. Third, to enhance the performance of the method carrier 22 may be buttressed with more carrier material 36 at the location of a slot 40 between the fiber blocks, 28, 29 as shown in the top view of FIG. 3b.

Figure 4:
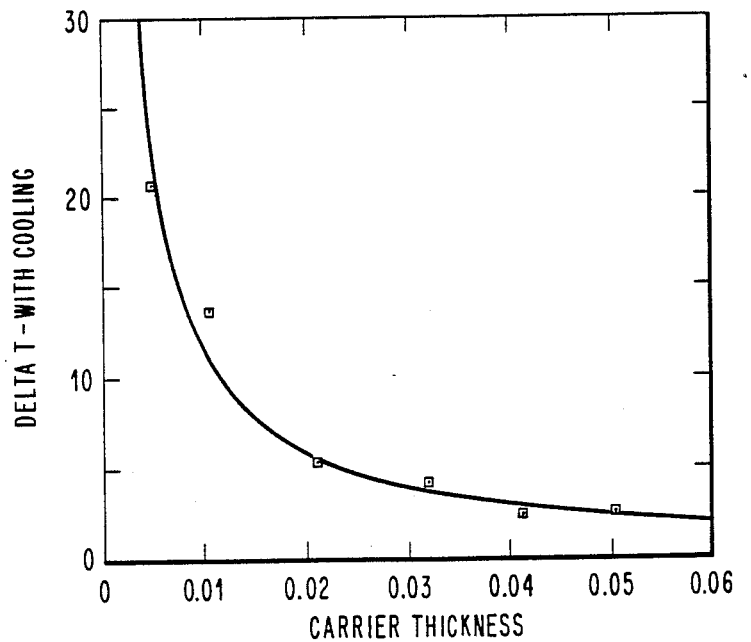
FIG. 4 is a graph showing temperature differences for different carrier thicknesses.

The slot 40 provides some thermal insulation between the separate fiber block connections 28, 29 to impede the lateral transfer of heat. In use, thermoelectric coolers 31, 32 under carrier 22 separately regulate the temperature of each fiber connection 28, 29. This allows us to maintain a cold enough temperature at the first fiber connection point 28 to prevent its solder from melting while the second fiber block 29 is connected with solder. FIG. 4 shows how much temperature difference is developed between each fiber block connection point as a function of carrier thickness for the case where no slot 40 is present. A greater temperature difference is developed when a slot 0 is present because the slot reduces the cross-sectional area through which heat flows. This slot can be modified to be a series of small holes of various shapes without altering its purpose.

Figures 6C, 6D:
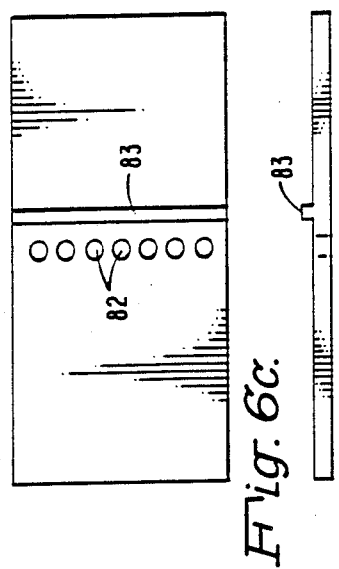
FIGS. 6a–6h are top and cross-sectional diagrammatic views of four embodiments of an enhancement to the preferred embodiment of FIGS. 3a and 3b.
Figures 6G, 6H:
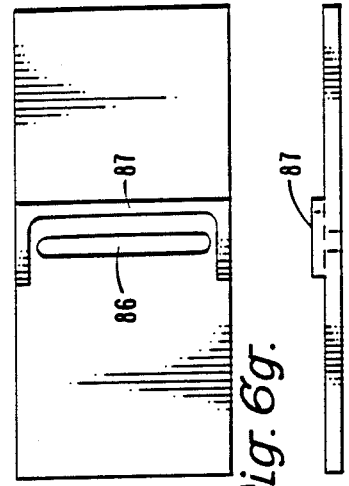
Figures 6A, 6B:
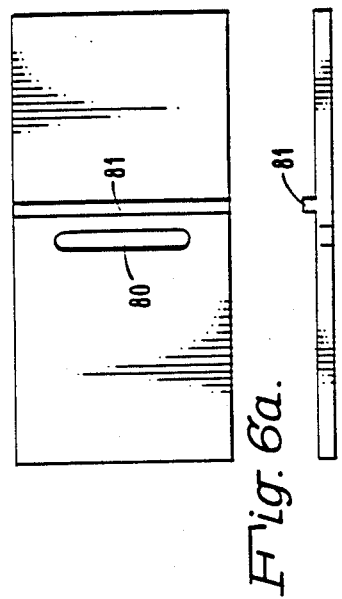
Figures 6E, 6F:
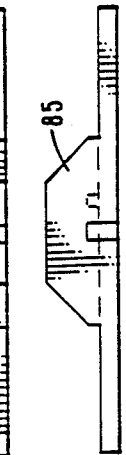

FIGS. 6a-6h illustrate four alternate designs for slot 40 and added carrier material 36. FIGS. 6a-6b show a large slot 80 and a bar 81 of additional carrier material. FIGS. 6c-d show a series of holes 82 and a bar 83. FIGS. 6e-f show a slot 84 and a buttress 85. FIGS. 6g-h show a slot 86 reinforced with carrier material 87.

Figure 7:
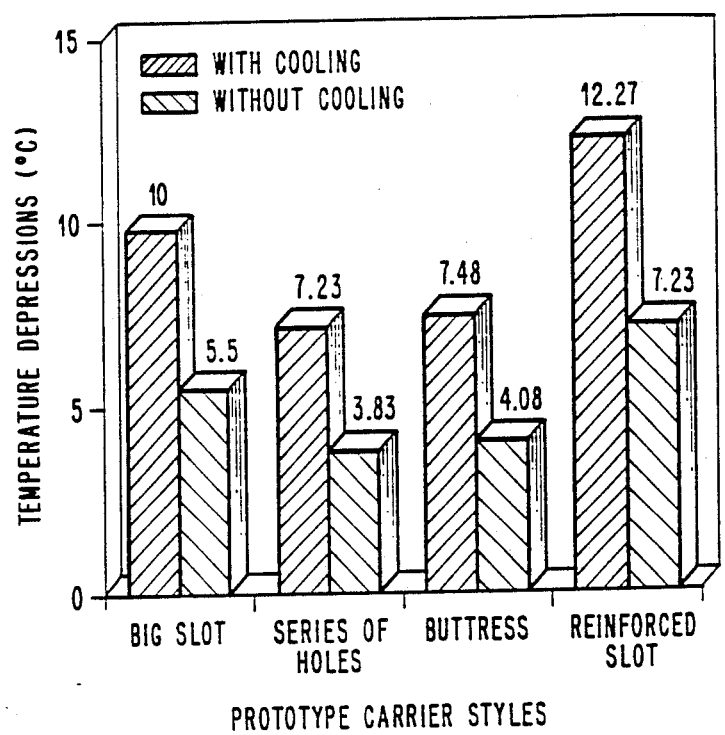
FIG. 7 is a graph plotting the improvement in thermal depression using the enhancements of FIGS. 6a–6h.

FIG. 7 is a graph showing the thermal depression resulting from the configurations of FIGS. 6a-6h from left to right, both with and without cooling from the thermoelectric coolers. The data was obtained from tests of prototype packages.

Figure 5:
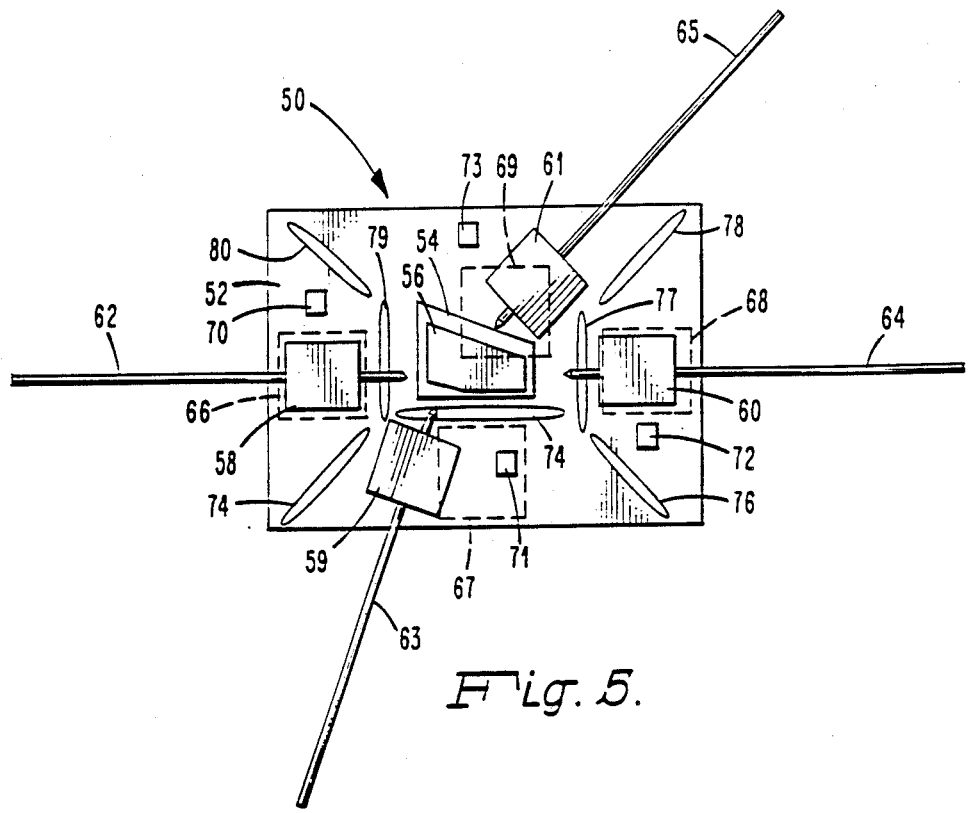
FIG. 5 is a diagrammatic top view of the preferred embodiment for an optoelectronic integrated circuit package requiring more than two stabilized fibers, according to the invention.

FIG. 5 is a diagrammatic top view of a further embodiment of the multi-fiber alignment package for optoelectronic components according to the invention. In FIG. 5 package 50 includes a carrier 52, a sub-carrier 54 and an optoelectronic integrated circuit 56 secured to subcarrier 54. Four fiber blocks 58-61 each have one optical fiber 62-65 respectively threaded therethrough, which fibers are to be coupled to circuit 56. Each fiber block has an associated thermoelectric cooler 66-69 secured to the underside of carrier 52 (shown in outline in FIG. 5) and an associated thermistor 70-73. The localized cooling technique for sequential alignment of fibers 62-65 and soldering of fiber blocks 66-69 is identical to the previously described method. However, the use of slots as an optional enhancement to the localized cooling technique requires that slots be positioned such that they impede thermal conductivity between any two adjacent fiber block connection positions. The layout of FIG. 5 shows seven slots 74-80 to enhance the thermal isolation of the four fiber block connection points.

Figure 1A:
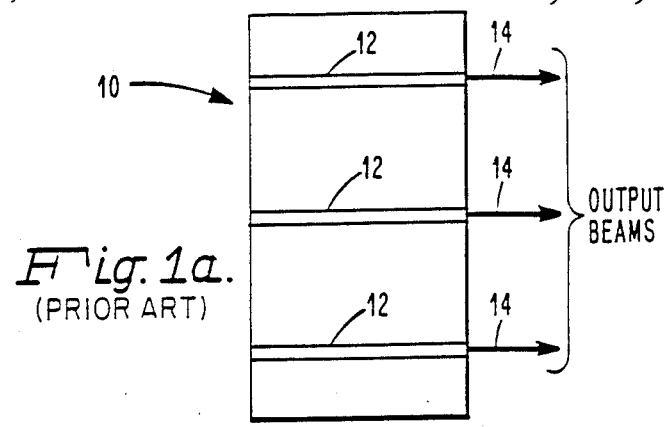
FIG. 1a is a diagrammatic top view of an array of three semiconductor lasers.
Figure 1B:
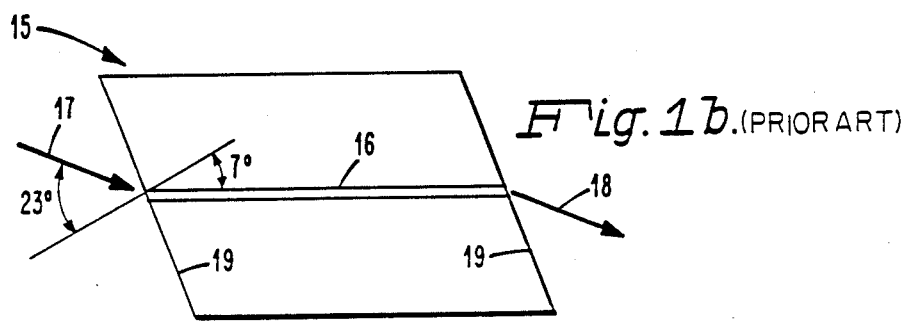
FIG. 1b is a diagrammatic top view of a tilted facet laser amplifier.
Figure 2:
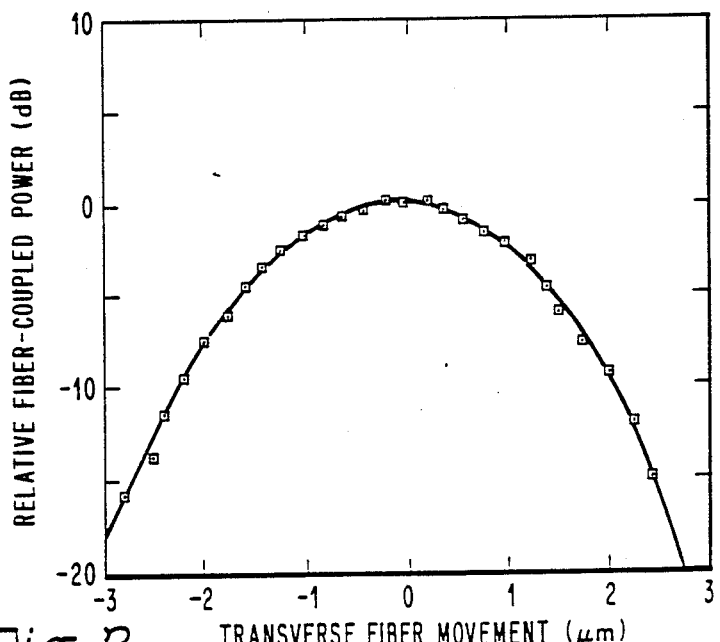
FIG. 2 is a graph showing the transverse sensitivity of a tapered optical fiber coupling to a laser.

Lasers such as shown in FIG. 1a require fibers which are perpendicular to the facets. For a tilted-facet laser amplifier as shown in FIG. 1b, maximum coupling efficiency requires that the input and output fibers be tilted with respect to the facet. Instead of tilting the fiber within the package, we tilt the amplifier-submount unit 24 at a predetermined, compensating angle, as shown in FIG. 3. For a typical facet tilt of 7°, the compensating angle is 23°. By tilting the amplifier-submount unit 24 in this way, the fibers 30, 31 can be aligned with the micromanipulator arm using the same technique for both lasers and tilted-facet components such as amplifiers. The compensation-tilting is done when the amplifier-submount unit 24 is attached to the carrier 22, prior to the fiber alignment. This submount attachment is typically done with a solder which has a higher melting point compared t the solder used for the fiber alignment, thus preventing the component from shifting during the fiber alignment. Such solders are readily available commercially.

It should be obvious to those versed in the art that this invention can be modified in a number of ways without changing its basic function and operation. For example, more than two fibers can be aligned if each had its own thermoelectric cooler and temperature control. Heating and cooling can be supplied by a cold/hot heat exchanger system rather than a thermoelectric cooler. Also, the tilted semiconductor component can be on a different type of submount or even no submount, in which case it would be directly bonded to the carrier. The carrier material may be metallized ceramic, silicon waferboard, printed circuit board or other material. This system would also work with multimode fiber, GRIN lenses (also commercially available), uptapered fiber, or optical waveguides, provided that these components may be shifted to allow for performing the micromanipulation of an optical alignment.

We claim:

1. A multi-fiber alignment package for optoelectronic components, comprising:
   a carrier of a thermally conductive material, said carrier having two opposed major surfaces;
   at least one optoelectronic component mounted on a first major surface of said carrier;
   a plurality of fiber-positioning means on said first major surface of said carrier, each holding one of said optical fibers coupled to said component;
   a plurality of cooling means secured to the second major surface of said carrier, each of said cooling means having a major surface positioned below one of said fiber-positioning means and each being capable of locally controlling the temperature of said carrier in its immediate vicinity; such that each one of said optical fibers may be actively aligned with said component and secured in said aligned position with solder sequentially;
   said cooling means serving to locally cool said carrier under said fiber-positioning means during soldering of the fiber-positioning means above it; such that said local cooling causes the heat of said soldering to be conducted away from said carrier at the connection point, thus enabling the sequential soldering of each of said fiber-positioning mean without affecting a previously soldered connection point.

2. The package of claim 1 further comprising:
   a submount secured to said first major surface of said carrier; and
   said component being mounted on said submount.

3. The package of claim 1 wherein said fiber-positioning means is a fiber block.

4. The package of claim 3 wherein:
   each of said optical fibers is threaded through one of said fiber blocks such that a first end of said optical fiber protrudes from one surface of said fiber block and a second end of said optical fiber protrudes from an opposed surface of said fiber block; and
   that portion of said optical fiber within said fiber block is secured therein with solder.

5. The package of claim 1 wherein said solder used to secure said fiber-positioning means comprises a sharp melting point solder having a narrow temperature range between its liquid phase working temperature and its solid phase used to secure said fiber-positioning means to said carrier.

6. The package of claim 1 further comprising:
   at least one opening through said carrier between any of said fiber-positioning means, such that said openings impede the lateral flow of heat through said carrier.

7. The package of claim 3 wherein said solder used to mount said submount to said carrier comprises a solder having a higher melting point than any other solder used on said carrier.

8. The package of claim 1 wherein said carrier is reinforced with additional carrier material between any two of said fiber blocks to impede lateral thermal conductivity.

9. The package of claim 1 wherein said cooling means comprises a thermoelectric cooler to provide local cooling during assembly of said package and to maintain a constant carrier temperature for stable operation of said component.

10. A method for precise, stable alignment of multiple optical fibers to an optoelectronic component, comprising the steps of:
   selecting a rigid carrier of a thermally conductive material, said carrier having two opposed major surfaces;
   securely mounting said optoelectronic component on a first major surface of said carrier;
   securing each of said optical fibers to be coupled to said component in its own fiber-positioning means;
   positioning each fiber-positioning means on said first major surface of said carrier such that each of said optical fibers is approximately aligned with said component;
   securing a major surface of one thermoelectric cooler on said second major surface of said carrier under each of said fiber-positioning means;
   actively aligning each one said optical fibers with said component sequentially, wherein said active aligning comprises the steps of:
      causing said component to emit a beam of light;
      coupling a photodetector to a first end of said optical fiber;
      manipulating said fiber-positioning means with a micromanipulator until a second, opposed end of said optical fiber is optimally coupled to said component;
   cooling said carrier locally under said fiber-positioning means by reversing the polarity of said thermoelectric cooler positioned under said fiber-positioning means;
   soldering said fiber-positioning means to said carrier while said optical fiber is optimally coupled to said circuit and while said carrier is being cooled locally;
      such that said local cooling causes the heat of said soldering to be conducted away from said carrier at the connection point, thus enabling the sequential soldering of each of said fiber-positioning means without affecting a previously soldered connection point.

11. The method of claim 10 wherein said step of securely mounting said component comprises the steps of:
   securing said component to a submount; and
   securing said submount to said first major surface of said carrier.

12. The method of claim 10 wherein said fiber-positioning means is a fiber block.

13. The method of claim 12 wherein the step of securing each of said optical fibers comprises the steps of:
   treading said optical fiber through said fiber block such that a first end of said optical fiber protrudes from one surface of said fiber block and a second end of said optical fiber protrudes from an opposed surface of said fiber block; and surface of said carrier; and
   surrounding that portion of said optical fiber within said fiber block with solder.

14. The method of claim 10 wherein said step of soldering said fiber-positioning means further comprises the step of choosing a sharp melting point solder having a narrow temperature range between its liquid phase working temperature and its solid phase used to secure said fiber-positioning means to said carrier.

15. The method of claim 10 further comprising the step of:
   forming at least one opening through said carrier between any two of said fiber-positioning means, such that said openings impede the lateral flow of heat through said carrier.

16. The method of claim 11 wherein said step of mounting said submount to said carrier comprises the step of soldering the sumbount using a solder having a higher melting point than the other solder used to secure said fiber-positioning means on said carrier.

17. The method of claim 10 further comprising the step of adding carrier material to said carrier between any two fiber-positioning means to impede the lateral conduction of heat through said carrier.

* * * * *